Sept. 9, 1924.

E. H. COOPER

DOUBLE ROW ANGULAR BEARING

Filed Dec. 29, 1922

1,507,586

INVENTOR
Elisha H. Cooper
BY
Mitchell Brothers
ATTORNEYS

Patented Sept. 9, 1924.

1,507,586

UNITED STATES PATENT OFFICE.

ELISHA H. COOPER, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

DOUBLE-ROW ANGULAR BEARING.

Application filed December 29, 1922. Serial No. 609,583.

*To all whom it may concern:*

Be it known that I, ELISHA H. COOPER, a citizen of the United States of America, residing at New Britain, Connecticut, have invented a new and useful Double-Row Angular Bearing, of which the following is a specification.

My invention relates to a double row ball bearing of the so-called unit handling type. It is the principal object of my invention to provide a ball bearing of the character indicated wherein a so called angular contact, double row ball bearing will be formed and one in which the grooves forming the raceways will be continuous and uninterrupted.

In the drawings which show for illustrative purposes only, a preferred form of the invention, Fig. 1 is a view in side elevation of a ball bearing, embodying features of my invention.

In said drawings, 5 indicates an outer bearing ring having two spaced apart raceway grooves 6—7 therein. These grooves are preferably relatively deep and are continuous and uninterrupted, that is, no so called side filling notches are required. 8 indicates an inner bearing ring having the raceway grooves 9—10 therein complementary to grooves 6—7 in the outer ring. The grooves 9—10 like the complementary grooves 6—7 are preferably rather deep and are continuous and uninterrupted in the sense above described.

Figure 3:
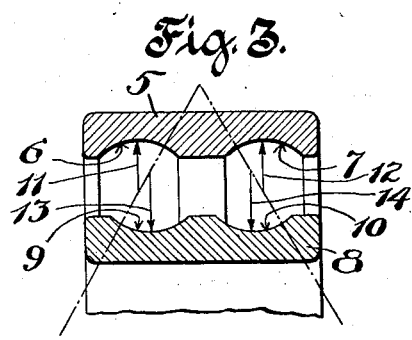
Fig. 3 is a fragmentary, partially diagrammatic view of the bearing rings in section.

The center lines of the grooves in one of the bearing rings, in this case the outer, are spaced apart a greater distance than the center lines of the grooves in the other bearing ring. This construction will be made clear by an examination of Fig. 3 in which the center lines of the grooves in the outer bearing ring are indicated at 11—12, while the center lines of the grooves in the inner bearing ring are indicated at 13—14. It will be seen that the grooves in the outer ring are therefore spaced apart a greater distance than the complementary grooves in the inner ring.

Figure 1:
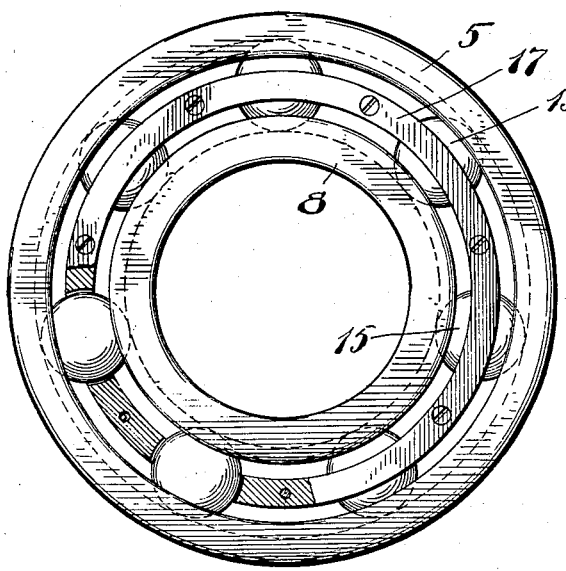
Figure 2:
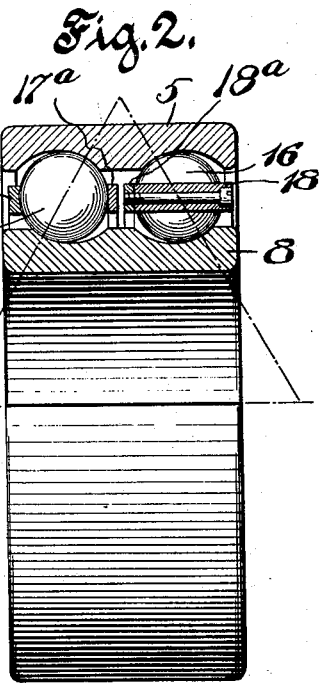
Fig. 2 is a view in edge elevation, and quarter section of the bearing shown in Fig. 1.
Figure 4:
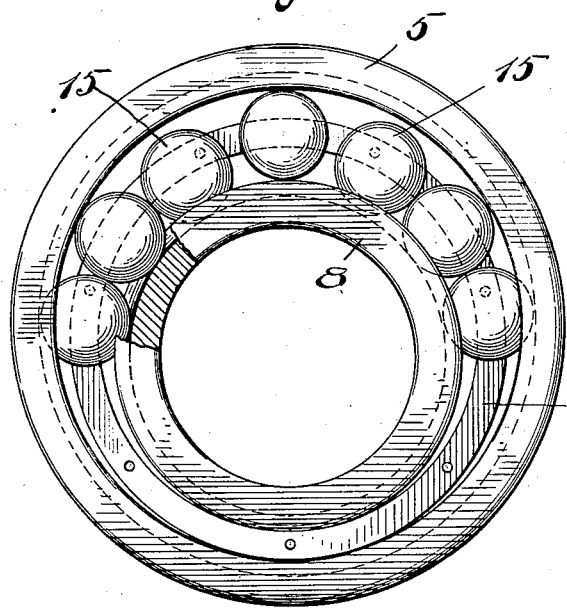
Fig. 4 is a view similar to Fig. 1, but showing the rings in positions occupied during filling.

15—16 indicate the bearing balls in the two rows provided in each bearing. Since the grooves or raceways are uninterrupted by filling notches, it is impossible to completely fill the two rows with bearing balls. In Fig. 4 I have indicated somewhat diagrammatically the method of filling the grooves by first displacing the inner and outer rings relatively to each other and then inserting as many balls as may be inserted or any lesser desired number. After both rows have been provided with the requisite number of bearing balls, the rings are again moved to normal position relatively to each other and the balls in the respective rows are spaced apart by means of suitable spacers 17—17ª and 18—18ª.

It will be seen that due to the difference in the spacing of the grooves in the two rings that an angular contact bearing will be formed, that is to say, the line passing through the points of contact of any one ball with the inner and outer rings will lie at an angle to the central plane of the bearing. The angularity and the spacing of the grooves in the drawings have been exaggerated somewhat for the purpose of illustration but in practice the angularity may be less. With a bearing, as above described, a double row angular contact bearing and one having unitary rings with continuous uninterrupted raceway grooves therein, is provided.

Figure 5:
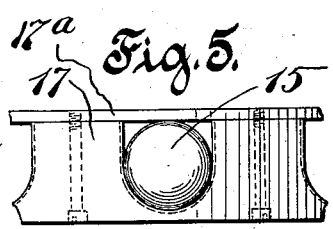
Fig. 5 is a fragmentary detail view.

Each spacer shown in the drawing comprises two separable ring members, one of which is recessed as shown in Fig. 5, to receive the balls and hold them at spaced intervals around the raceways whereby said balls seem to hold the rings 5—8 concentric at all times after the spacers are applied. The form and construction of the spacers may be varied so long as they are such as to not prevent the assembling of the bearing.

As will be seen by reference to Fig. 4, in the act of assembling the bearing the internal sections of each of the spacers are present between the eccentrically displaced rings. In this view, Fig. 4, the internal section 17ª is plainly shown as displaced eccentrically with the ring 8. The other internal section, 18ª, for the spacer for the other row of balls, lies behind the section 17ª shown in Fig. 4, and while present during assembly is not seen in Fig. 4. It should be understood, of course, that the shape and proportions of these internal sections are such that the bearing rings 8 and 5 may be displaced sufficiently to permit an adequate number of balls to be inserted. Until the other sections 17—18 of the respective ball spacers are applied, the sections 17ª—18ª will of course be loose. When, however, the parts are arranged concentrically, the sections 17—18 may be applied and secured, in any suitable manner, to the internal sections 17ª—18ª so as to form two separate and independent spacer elements for the two separate rows of balls. From the foregoing it will be seen that an important feature of my invention comprises making each spacer for each row of balls of at least two pieces, which I may respectively term internal and external sections.

The number of balls used in each raceway need not exceed that number that may be freely inserted by reason of the ring displacement indicated in Fig. 4.

While a preferred form of the invention has been disclosed, it should be understood that I do not wish to be confined to the exact form shown, since changes may be made within the scope of the appended claims.

I claim:

1. In a ball bearing of the unit handling type, an inner ring, an outer ring, each of said rings having two continuous grooved raceways therein, the raceways in each ring being continuous and uninterrupted at the sides, the distance between the center lines of the raceways in one of said rings being greater than the distance between the center lines of the raceways in the other ring, balls in said raceways, and spacers for spacing the balls of each row apart, each spacer comprising at least two sections secured together.

2. In a ball bearing of the unit handling type, an inner ring, an outer ring, said inner ring having two continuous grooved raceways therein, each of said raceways being continuous and uninterrupted, said outer ring having two continuous interrupted grooved raceways therein complementary to the raceways in said inner ring, bearing balls in said raceways, the distance between the center lines of the raceways in one of said rings being greater than the distance between the center lines of the raceways in the other ring, whereby the lines passing through the points of contact of a bearing ball and opposite raceways will lie at an angle to the central plane of the bearing and spacers for spacing the balls of each row apart, each spacer comprising at least two sections secured together.

3. In a ball bearing of the unit handling type, an inner ring, an outer ring, each of said rings having two spaced apart grooves therein forming raceways, bearing balls in said raceways, each of said grooves being continuous and uninterrupted, the points of contact of the bearing balls with the two grooves in one ring being spaced apart a greater distance than the points of contact of the bearing balls with the grooves in the other ring, whereby the bearing balls in said grooves will have an angular contact with said inner and outer rings and spacers for spacing the balls of each row apart, each spacer comprising at least two sections secured together.

ELISHA H. COOPER.